(12) United States Patent
Esumi et al.

(10) Patent No.: US 7,889,446 B2
(45) Date of Patent: Feb. 15, 2011

(54) BASELINE CORRECTION APPARATUS

(75) Inventors: Atsushi Esumi, Kanagawa (JP); Kai Li, Kanagawa (JP); Hidemichi Mizuno, Tokyo (JP)

(73) Assignee: Rohm Co., Ltd. (JP)

( * ) Notice: Subject to any disclaimer, the term of this patent is extended or adjusted under 35 U.S.C. 154(b) by 415 days.

(21) Appl. No.: 12/041,715

(22) Filed: Mar. 4, 2008

(65) Prior Publication Data
US 2008/0218890 A1 Sep. 11, 2008

(30) Foreign Application Priority Data
Mar. 7, 2007 (JP) .............................. 2007-056563

(51) Int. Cl.
G11B 5/02 (2006.01)
(52) U.S. Cl. .............................. 360/25; 360/39; 360/46; 360/65
(58) Field of Classification Search ........................ None
See application file for complete search history.

(56) References Cited
U.S. PATENT DOCUMENTS

| | | | | |
|---|---|---|---|---|
| 6,047,026 A * | 4/2000 | Chao et al. | ................. | 375/233 |
| 6,148,025 A * | 11/2000 | Shirani et al. | ............... | 375/238 |
| 6,211,716 B1 * | 4/2001 | Nguyen et al. | .............. | 327/307 |
| 6,385,238 B1 * | 5/2002 | Nguyen | ..................... | 375/232 |
| 6,415,003 B1 * | 7/2002 | Raghavan | ................... | 375/317 |
| 6,775,529 B1 * | 8/2004 | Roo | ........................... | 455/296 |
| 7,167,327 B2 * | 1/2007 | Feyh | ........................... | 360/46 |
| 7,525,746 B1 * | 4/2009 | Oberg | ........................ | 360/39 |
| 7,583,456 B1 * | 9/2009 | Oberg et al. | .................. | 360/25 |
| 2003/0107423 A1 * | 6/2003 | Yeh | ............................. | 327/307 |
| 2007/0286315 A1 * | 12/2007 | Hong et al. | ................. | 375/345 |

FOREIGN PATENT DOCUMENTS

| | | |
|---|---|---|
| JP | 11-185209 | 7/1999 |
| JP | 11-266185 | 9/1999 |
| JP | 2004-127409 | 4/2004 |

* cited by examiner

Primary Examiner—Dismery E Mercedes
(74) Attorney, Agent, or Firm—Cantor Colburn LLP

(57) ABSTRACT

A read channel includes a variable gain amplifier, a low-pass filter, an AGC, an analog-to-digital converter, a frequency synthesizer, a filter, a soft-output detector, an LDPC decoding unit, a synchronizing signal detector, a run-length limited decoding unit, a descrambler, and a first baseline wander corrector. The first baseline wander corrector corrects a baseline variation by a feedforward control.

6 Claims, 12 Drawing Sheets

BASELINE CORRECTION APPARATUS

BACKGROUND OF THE INVENTION

1. Field of the Invention

The present invention relates to a technology for accessing a storage medium and, more particularly, to a baseline correction apparatus for correcting a baseline of input signal.

2. Description of the Related Art

In the area of disk drives, attention has recently been focused on disk storage apparatuses of vertical magnetic recording system which are capable of increasing the recording density. With the conventional disk drives of longitudinal magnetic recording method, a magnetization corresponding to binary recorded data is formed in the longitudinal direction of the disk medium. In contrast to this, with the disk drives of vertical magnetic recording method, the same magnetization is formed in the depth direction of the disk medium.

Generally, with disk drives, data are recorded on the disk medium by a NRZ (non-return-to-zero) record encoding method. When the recorded data are read by the head from the surface of the disk medium, the reproduced signals (read signals) are a dipulse signal sequence for a longitudinal magnetic recording system. For a vertical magnetic recording system, on the other hand, the same reproduced signals are a pulse signal stream including a direct current (DC) low-frequency component.

Generally, the read channel system (reproduced signal processing system including a read amplifier) of a disk drive is such that the analog front-end circuit of a read amplifier, AC coupling, and the like has a low-frequency cutoff characteristic. This is intended in part to improve the SNR (signal-to-noise ratio) of reproduced signals by removing unnecessary low-frequency noise component from reproduced signals.

In a vertical magnetic recording system, the reproduced signals contain low-frequency components, and thus a phenomenon in which the baselines of reproduced signals are varied is observed when the low-frequency noise components are cut off by the analog front-end circuit having a low-frequency cutoff characteristic. If such variation in the baseline of reproduced signals occurs, a problem of higher decoding error rate will arise when the recorded data are decoded from the reproduced signals.

To resolve this problem, one possible solution may be to lower the low-frequency cutoff frequency of the read channel system. However, simply widening the passband will lead to an SNR deterioration of reproduced signals because it cannot cut off the low-frequency noise components. Moreover, the read amplifier, in particular, is normally sensitive to the low-frequency noise, such as 1/f noise, so that it is even more subject to the SNR deterioration. Hence, with a vertical magnetic recording system, simply lowering the low-frequency cutoff frequency of the read channel will rather result in raising the error rate.

As a conventional method for countering the baseline variation, there has been a proposed technique in which an ideal value of baseline and the difference of it from the actual value of baseline are determined and correction is made by feeding back the value of difference to a process before the input side of the A-D converter (See Reference (1) in the following Related Art List, for instance). Also, another proposed technique achieves a baseline without variation by first obtaining reverse characteristics of varying components of the baseline and then finding the differences from the varying baseline (See Reference (2), for instance). Also, there is a proposed method for correcting the baseline variation by the use of the total value of detected direct current components of analog signals (See Reference (3), for instance).

Related Art List (1) Japanese Patent Application Laid-Open No. 2004-127409.

(2) Japanese Patent Application Laid-Open No. Hei11-185209.

(3) Japanese Patent Application Laid-Open No. Hei11-266185.

Under these circumstances, the inventors have come to realize the following problem. Conventionally, baseline correction has been done by calculating the necessary amount of correction and feeding it back to a preceding stage, which results in a delay in the timing of correction as much as the time taken to calculate the amount of correction. And this delay can be fatal and unacceptable to storage apparatuses of recent years which must make access for read and write at a speed exceeding 1 Gbps. In other words, a baseline correction, when done by the conventional method, can be inaccurate because the amount of correction to be used in the correction is based on past data. The problem therefore is that where access at higher speed is required, this baseline variation can adversely affect the subsequent circuits for error correction and the like.

SUMMARY OF THE INVENTION

The present invention has been made in view of the foregoing circumstances and a general purpose thereof is to provide a technology capable of correcting baseline variation efficiently, particularly for storage apparatuses required of making high-speed access.

In order to resolve the foregoing problems, a baseline correction apparatus according to one embodiment of the present invention includes: an input unit which receives input of an analog-to-digital converted digital signal; a baseline variation decision unit which determines whether there is a long-term variation in the digital signal or not, based on the digital signal inputted to the input unit; a correction signal generator which generates a correction signal that depends on the long-term variation, based on the digital signal inputted to the input unit; and a correction unit which corrects the digital signal inputted from the input unit, based on the correction signal generated by the correction signal generator when it is determined that there is a baseline variation, or which does not correct the digital signal when it is determined that there is no baseline variation, whereby said baseline correction apparatus corrects the baseline variation in the digital signal.

Here, "determining whether there is a long-term variation or not" includes determining whether or not a variation occurs in a baseline indicated by the digital signal inputted within a predetermined period. "Generating a correction signal that depends on the long-term variation" includes estimating a variation amount of baseline and defining the estimated amount of variation as a correction amount. In such a case, the correction signal may be the estimated amount of variation or a value where the estimated amount of variation is multiplied by a weight. According to this embodiment, the correction is made only when there is a baseline variation, so that correction can be made efficiently.

Another embodiment of the present invention relates also to a baseline correction apparatus. This apparatus includes: an input unit which receives input of an analog-to-digital converted digital signal; a conversion unit which converts the digital signal inputted to the input unit, into a decision signal that takes any one of three values over time; a moving averaging unit which takes a moving average of the decision signal from the conversion unit; a decision unit which determines whether the decision signal is balanced over time or not, based on an output of the moving averaging unit; and a correction unit which corrects the digital signal from the input unit when the decision signal is not balanced over time or which does not correct the digital signal when the decision signal is balanced over time, based on an output of the decision unit, whereby said baseline correction apparatus corrects the baseline variation in the digital signal.

Here, " . . . is balanced over time" includes a mode where over a certain period of time the baseline variation amount lies within a predetermined range. According to this embodiment, the correction is made only when the decision signal is not balanced over time, so that correction can be made efficiently. The use of the decision signal having three values makes the decision easier.

The moving averaging unit may be structured such that a different output is generated between in a first case where in the decision signals a middle value of the three values continues for a predetermined period or a difference between the numbers of two values opposite to each other with the middle value interposed therebetween is less than or equal to a predetermined number in the predetermined period, and in a second case where in the decision signals the difference between the numbers of two values opposite to each other with the middle value interposed therebetween is greater than or equal to the predetermined number in the predetermined period; and in the first case the decision unit may determine, based on an output of the moving averaging unit, that the value of the decision signal is balanced over time.

The "middle value of the three values" includes a center value of the three values. "Two values opposite to each other with the middle value interposed therebetween" includes the maximum value and the minimum value of the three values. In this case, the use of the decision signal having the three values makes the decision easier.

The decision signal may take values of "−1", "0" and "1" and the moving averaging unit may convert the three values into converted signals of "0", "1", and "2", respectively, and add up a change over time in the converted signals for a predetermined period so as to be outputted; and when a summation output is within a predetermined range, the decision unit may determine that the decision signal belongs to the first case. "Adding up a change over time in the converted signals for a predetermined period so as to be outputted" may be an averaging processing such as a moving average processing. In this case, the use of the converted signal which is greater than or equal to "0" can easily configure a subsequent circuit.

The correction unit may have a correction means which corrects the baseline of the digital signal, based on the moving average of the digital signal. Correction by the use of the moving average enables accurate correction while following up the variation.

The decision signal may take values of "−1", "0" and "1" and the moving averaging unit may convert the three values into converted signals greater than or equal to "0", respectively, and add up a change over time in the converted signals for a predetermined period so as to be outputted; and when a summation output is within a predetermined range, the decision unit may determine that the decision signal belongs to the first case. In this case, the use of the converted signal which are greater than or equal to "0" can easily configure a subsequent circuit configuration.

Still another embodiment of the present invention relates also to a signal processing apparatus. This apparatus includes a baseline variation correcting unit provided in a processing path in which a predetermined processing is performed on an input signal, wherein the baseline variation correcting unit includes: a baseline variation derivation unit which derives an amount of variation in baseline of a signal on which the predetermined processing has been performed; and an adjustment unit which adjusts an amount of baseline variation derived by the baseline variation derivation unit and outputs a baseline correction amount.

According to this embodiment, the variation in baseline can be corrected efficiently.

Still another embodiment of the present invention relates also to a signal processing apparatus. This signal processing apparatus further includes an A-D converter provided in the processing path, wherein the baseline variation correcting unit is placed in a digital signal path that forms an output side of the A-D converter, and baseline variation is corrected by a feedforward control.

According to this embodiment, the correction is carried out by the feedforward control, so that the baseline variation can be corrected in the event that there occurs an instantaneous variation.

Still another embodiment of the present invention relates also to a signal processing apparatus. In this signal processing apparatus, the adjustment unit includes: an averaging unit which calculates an average value of an output signal of the baseline variation derivation unit; and a weighting unit which multiplies the average value calculated by the averaging unit, by a predetermined weighting factor.

According to this embodiment, taking the average can reduce the effect of noise and the like. Also, the weighting factors can adjust the response time.

Still another embodiment of the present invention relates also to a signal processing apparatus. In this signal processing apparatus, the baseline variation correcting unit includes a correction permission control unit which controls whether correction is to be permitted or not, and the baseline variation correcting unit corrects baseline correction of the input signal by a feedforward control, based on a control of the correction permission control unit.

According to this embodiment, the correction is made after whether the correction shall be made or not is decided, so that the correction can be done with accuracy.

Still another embodiment of the present invention relates also to a signal processing apparatus. In this signal processing apparatus, when it is determined that the correction of baseline variation is not necessary, the correction permission control unit rejects the correction by the baseline variation correction unit.

According to this embodiment, when it is determined that the correction is not needed, the correction is not made. Thus, the variation in baseline can be corrected efficiently.

Still another embodiment of the present invention relates also to a signal processing apparatus. In this signal processing apparatus, when the baseline variation is less than a predetermined threshold value, it is determined by the correction permission control unit that the correction of baseline variation is not necessary.

According to this embodiment, whether the correction is to be performed or not is determined by a threshold value, so that it is possible to achieve a flexible control.

Still another embodiment of the present invention relates also to a signal processing apparatus. In this signal processing apparatus, the baseline variation derivation unit includes: a slicer which performs a hard decision processing on a signal subjected to the predetermined processing; and a subtractor which subtracts the signal which has been hard-decision processed by the slicer, from the signal subjected to the predetermined processing.

According to this embodiment, the results of hard decision processing are used, so that the amount of variation can be obtained at high speed.

Still another embodiment of the present invention relates also to a signal processing apparatus. In this signal processing apparatus, the baseline variation derivation unit further includes a selector which receives the inputs of the signal subjected to the predetermined processing and an output signal of the averaging unit and which outputs either the signal subjected to the predetermined processing or the output signal of the averaging unit to the slicer, according to a predetermined selection signal.

According to this embodiment, the original signal from which the amount of variation has been calculated can be selected by the selector, so that the flexible control can be achieved. Also, the amount of variation can be derived with better accuracy because the original signal from which the amount of variation has been calculated is used as the output of the averaging unit.

Still another embodiment of the present invention relates to a signal processing method. This method includes: deriving an amount of baseline variation in a signal subjected to an predetermined processing; and adjusting the amount of baseline variation derived by the deriving an amount of baseline variation and outputting the amount of baseline variation.

According to this embodiment, the baseline variation can be corrected efficiently.

Still another embodiment of the present invention relates to a storage system. This storage system has a write channel for writing a data to a storage apparatus and a read channel for reading out the data stored in the storage apparatus, and the write channel includes: a first coding unit which codes data into a run length code; a second coding unit which further codes the data coded by the first coding unit, using a low-density parity check code; and a write unit which writes the data coded by the second coding unit to the storage apparatus, and the read channel includes: a baseline variation correcting unit which corrects baseline variation of the data read out of the storage apparatus; a soft-output detector which calculates the likelihood of the data whose baseline has been corrected by the baseline variation correcting unit and which outputs a soft decision value; a second decoding unit, corresponding to the second coding unit, which decodes the data outputted from the soft-output detector; and a first decoding unit, corresponding to the first coding unit, which decodes the data decoded by the second decoding unit, wherein the baseline variation correcting unit includes: a baseline variation derivation unit which derives an amount of variation in baseline of a signal on which the predetermined processing has been performed; and an adjustment unit which adjusts an amount of variation in the baseline derived by the baseline variation derivation unit and outputs a baseline correction amount.

According to this embodiment, since the baseline variation can be corrected efficiently, the effect of baseline variation upon a decoding unit or the like placed in a subsequent stage can be reduced and therefore access can be made to the storage system at higher speed.

Still another embodiment of the present invention relates also to a storage system. This storage system further includes: a storage apparatus which stores data; and a control unit which controls write of data to the storage apparatus and read of data from the storage apparatus, wherein the read channel reads out the data stored in the storage apparatus in accordance with an instruction from the control unit, and wherein the write channel writes predetermined data to the storage apparatus in accordance with an instruction from the control unit.

According to this embodiment, since the baseline variation can be corrected efficiently, the effect of baseline variation upon a decoding unit or the like placed in a subsequent stage can be reduced and therefore access can be made to the storage system at higher speed.

Still another embodiment of the present invention relates to a semiconductor integrated circuit. This semiconductor integrated circuit is a semiconductor integrated circuit having a write channel for writing data to a storage apparatus and a read channel for reading out the data stored in the storage apparatus, the write channel including: a first coding unit which codes data into a run length code; a second coding unit which further codes the data coded by the first coding unit, using a low-density parity check code; and a write unit which writes the data coded by the second coding unit to the storage apparatus, and the read channel including: a baseline variation correcting unit which corrects baseline variation of the data read out of the storage apparatus; a soft-output detector which calculates the likelihood of the data whose baseline has been corrected by the baseline variation correcting unit and which outputs a soft decision value; a second decoding unit, corresponding to the second coding unit, which decodes the data outputted from the soft-output detector; and a first decoding unit, corresponding to the first coding unit, which decodes the data decoded by the second decoding unit, wherein the baseline variation correcting unit includes: a baseline variation derivation unit which derives an amount of variation in baseline of a signal on which a predetermined processing has been performed; and an adjustment unit which adjusts an amount of variation in the baseline derived by the baseline variation derivation unit and outputs a baseline correction amount. The circuit is integrally integrated on at least a single semiconductor substrate.

According to this embodiment, since the baseline variation can be corrected efficiently, the effect of baseline variation upon a decoding unit or the like placed in a subsequent stage can be reduced and therefore access can be made to the storage system at higher speed.

Arbitrary combinations of the aforementioned constituting elements, and the implementation of the present invention in the form of a method, an apparatus, a system and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

With reference to figures, a description will be given hereinbelow of specific modes of carrying out the present invention (hereinafter referred to as "embodiment" or "preferred embodiment").

First Embodiment

Before explaining a first embodiment of the present invention in concrete terms, a brief description will be given of a storage apparatus relating to the present embodiment. A storage apparatus according to the present embodiment includes a hard disk controller, a magnetic disk apparatus, and a read/write channel, which includes a read channel and a write channel. At the read channel, correction of the above-mentioned baseline variation is made on the data read out from the magnetic disk apparatus by a feedforward control. By this arrangement, it is possible to correct baseline variation efficiently without the effects of delay occurring at the time of correction even when there is an instantaneous large variation in baseline. This will be described in detail later.

Figure 1:
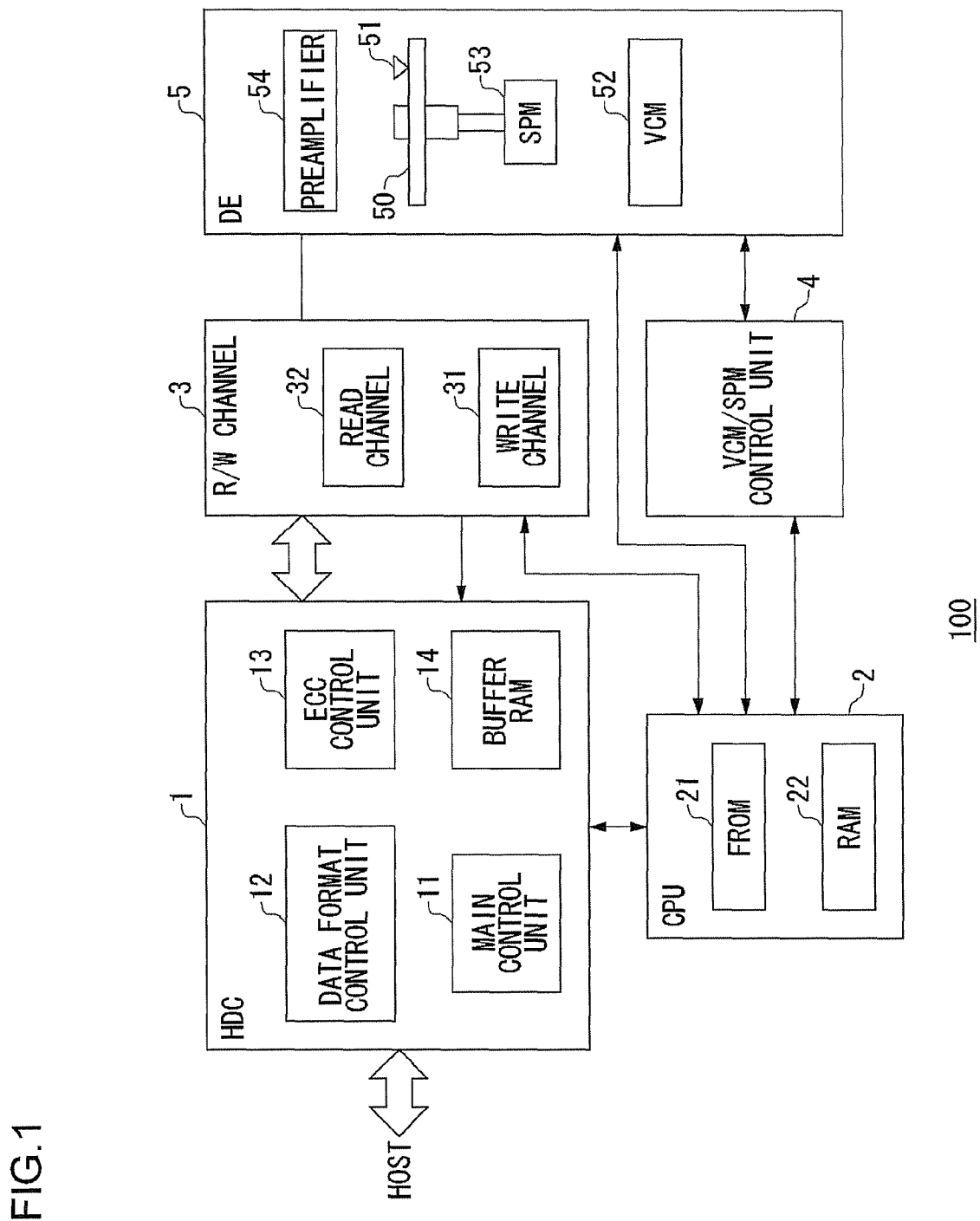
FIG. 1 illustrates an exemplary structure of a magnetic disk apparatus according to a first embodiment of the present invention.

FIG. 1 illustrates an exemplary structure of a magnetic disk apparatus 100 according to a first embodiment of the present invention. The magnetic disk apparatus 100 in FIG. 1 is comprised roughly of a hard disk controller 1 (hereinafter abbreviated as "HDC 1"), a central processing arithmetic unit 2 (hereinafter abbreviated as "CPU 2"), a read/write channel 3 (hereinafter abbreviated as "R/W channel 3"), a voice coil motor/spindle motor controller 4 (hereinafter abbreviated as "VCM/SPM controller 4"), and a disk enclosure 5 (hereinafter abbreviated as "DE 5"). Generally, an HDC 1, CPU 2, R/W channel 3, and VCM/SPM controller 4 are structured on a single substrate.

The HDC 1 includes a main control unit 11 for controlling the whole HDC 1, a data format control unit 12, an error correction coding control unit 13 (hereinafter abbreviated as "ECC control unit 13"), and a buffer RAM 14. The HDC 1 is connected to a host system via a not-shown interface unit. It is also connected to the DE 5 via the R/W channel 3, and carries out data transfer between the host and the DE 5 according to the control by the main control unit 11. Inputted to this HDC 1 is a read reference clock (RRCK) generated by the R/W channel 3. The data format control unit 12 converts the data transferred from the host into a format that is suited to record it on a disk medium 50 and also converts the data reproduced by the disk medium 50 into a format that is suited to transfer it to the host. The disk medium 50 includes a magnetic disk, for example. The ECC control unit 13 adds redundancy symbols, using data to be recorded as information symbols, in order to correct and detect errors contained in data reproduced by the disk medium 50. The ECC control unit 13 also determines if any error has occurred in reproduced data and corrects or detects the error if there is any. It is to be noted here that the number of symbols capable of error correction is limited and is relative to the length of redundancy data. In other words, addition of a larger amount of redundancy data may cause the format efficiency to drop, thus trading off with the number of symbols capable of error correction. If error correction is done using the Reed-Solomon code for ECC, the number of errors correctable will be "Number of redundancy symbols/2". The buffer RAM 14 stores temporarily data transferred from the host and transfers it to the R/W channel 3 with proper timing. Also, the buffer RAM 14 stores temporarily the read data transferred from the R/W channel 3 and transfers it to the host with proper timing after the completion of ECC decoding or the like.

The CPU 2 includes a flash ROM 21 (hereinafter abbreviated as "FROM 21") and an RAM 22, and is connected to the HDC 1, R/W channel 3, VCM/SPM controller 4, and DE 5. The FROM 21 stores an operation program for the CPU 2.

The R/W channel 3, which is roughly divided into a write channel 31 and a read channel 32, transfers data to be recorded and reproduced data to and from the HDC 1. Connected to the DE 5, the R/W channel 3 also performs transmission of recorded signals and reception of reproduced signals. This will be described in detail later.

The VCM/SPM controller 4 controls a voice coil motor 52 (hereinafter abbreviated as "VCM 52") and a spindle motor 53 (hereinafter abbreviated as "SPM 53") in the DE 5.

The DE 5, which is connected to the R/W channel 3, performs reception of recorded signals and transmission of reproduced signals. The DE 5 is also connected to the VCM/SPM controller 4. The DE 5 includes a disk medium 50, a head 51, a VCM 52, an SPM 53, and a preamplifier 54. In a magnetic disk apparatus 100 as shown in FIG. 1, it is so assumed that there is one disk medium 50 and the head 51 is disposed only on one side of the disk medium 50, but the arrangement may be such that a plurality of disk mediums 50 are formed in a stacked structure. Also, it should be understood that the head 51 is generally provided one for each face of the disk medium 50. The recorded signals transmitted from the R/W channel 3 are supplied to the head 51 by way of the preamplifier 54 in the DE 5 and then recorded on the disk medium 50 by the head 51. Conversely, the signals reproduced from the disk medium 50 by the head 51 are transmitted to the R/W channel 3 by way of the preamplifier 54. The VCM 52 in the DE 5 moves the head 51 in a radial direction of the disk medium 50 so as to position the head 51 at a target position on the disk medium 50. The SPM 53 rotates the disk medium 50.

Figure 2:
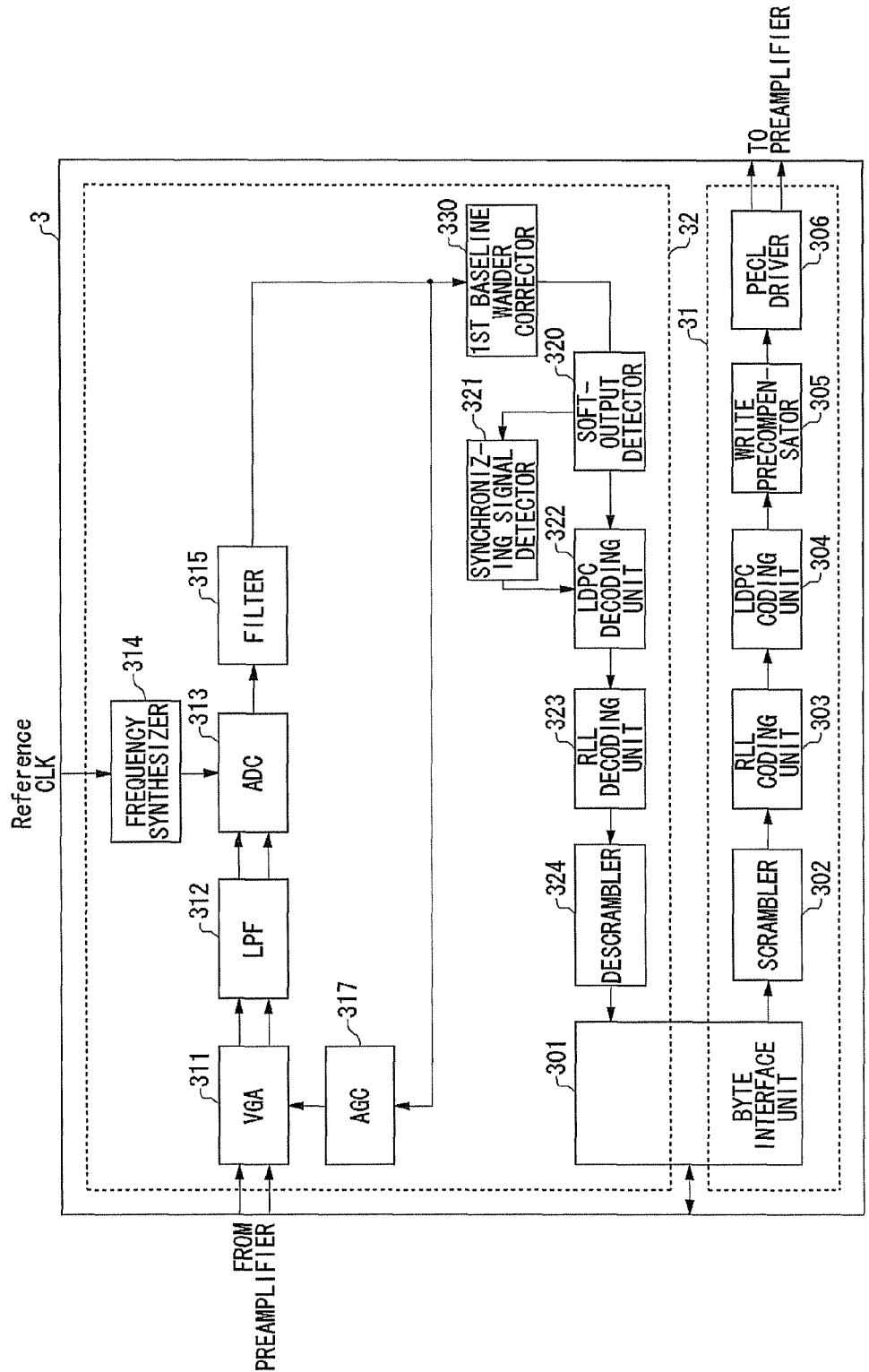
FIG. 2 illustrates an exemplary structure of an R/W channel shown in FIG. 1.

Referring now to FIG. 2, a description will be given of an R/W channel 3. FIG. 2 illustrates an exemplary structure of an R/W channel 3 as shown in FIG. 1. The R/W channel 3 is comprised roughly of a write channel 31 and a read channel 32.

The write channel 31 includes a byte interface unit 301, a scrambler 302, a run-length limited coding unit 303 (hereinafter abbreviated as "RLL coding unit 303"), a low-density parity check coding unit 304 (hereinafter abbreviated as "LDPC coding unit 304"), a write compensation unit 305 (hereinafter referred to as "write precompensator 305"), and a driver 306.

At the byte interface unit 301, data transferred from the HDC 1 are processed as input data. Data to be written onto the medium are inputted from the HDC 1 sector by sector. At this time, not only user data (512 bytes) for one sector but also ECC bytes added by the HDC 1 are also inputted simultaneously. The data bus, which is normally 1 byte (8 bits) long, is processed as input data by the byte interface unit 301. The scrambler 302 converts write data into a random sequence. The repetition of data of the same pattern is designed to remove any adverse effects on detection performance at reading, which may raise the error rate. The RLL coding unit 303 is used to limit the maximum run length. By limiting the maximum run length of "0", data are turned into a data sequence appropriate for an automatic gain controller 317 (hereinafter abbreviated as "AGC 317") and the like at reading.

The LDPC coding unit 304 plays a role of generating a data sequence containing parity bits, which are redundancy bits, by LDPC coding. The LDPC coding is done by multiplying a matrix of k×n, called a generator matrix, by a data sequence of length k from the left. The elements contained in a check matrix H corresponding to the generator matrix are "0" or "1", and the coding is called "low-density parity check coding because the number of 1's is smaller than the number of 0's. By utilizing the arrangement of these 1's and 0's, error correction will be carried out efficiently by an LDPC decoding unit 322, which will be described later.

The write precompensator 305 is a circuit for compensating the nonlinear distortion resulting from the continuation of magnetization transition on the medium. The write precompensator 305 detects a pattern necessary for compensation from write data and preadjusts the write current waveform in such a manner as to cause magnetization transition in correct positions. The driver 306 outputs signals corresponding to the pseudo ECL level. The output from the driver 306 is sent to the not-shown DE 5 and then sent to the head 51 by way of the preamplifier 54 before the write data are recorded on the disk medium 50.

The read channel 32 includes a variable gain amplifier 311 (hereinafter abbreviated as "VGA 311"), a low-pass filter 312 (hereinafter abbreviated as "LPF 312"), an AGC 317, an analog-to-digital converter 313 (hereinafter abbreviated as "ADC 313"), a frequency synthesizer 314, a filter 315, a soft-output detector 320, an LDPC decoding unit 322, a synchronizing signal detector 321, a run-length limited decoding unit 323 (hereinafter abbreviated as "RLL decoding unit 323"), a descrambler 324, and a first baseline wander corrector 330.

The VGA 311 and AGC 317 adjust the amplitude of the read waveform of data sent from a not-shown preamplifier 54. The AGC 317 compares an actual amplitude with an ideal amplitude and determines a gain to be set for the VGA 311. The LPF 312, which can adjust the cut-off frequency and boost amount, plays a partial role in reducing high-frequency noise and performing equalization on a partial response (hereinafter abbreviated as "PR") waveform. In the equalization to a PR waveform by the LPF 312, it is difficult to carry out a perfect equalization of analog signals by an LPF because of a number of factors including variation in head lift, non-uniformity of the medium, and variation in motor speed. Hence, equalization to the PR waveform is attempted again by a filter 315 located in a subsequent position and having greater flexibility. The filter 315 may have a function of adjusting its tap coefficient in an adaptable manner. The frequency synthesizer 314 generates a sampling clock for the ADC 313. The ADC 313 is of a structure to acquire a synchronous samples directly by A-D conversion. Note that in addition to this structure, the structure may be one to acquire an asynchronous samples by A-D conversion. In such a case, a zero phase restarter, a timing controller, and an interpolation filter may be further provided in positions subsequent to the ADC 313. Since a synchronous sample needs to be obtained from the asynchronous sample, such a function is performed by these blocks. The zero phase restarter, which is a block for determining an initial phase, is used to acquire a synchronous sample as quickly as possible. After the determination of the initial phase, the timing controller detects a phase shift by comparing an actual sample value against an ideal sample value. Then, the phase shift is used to determine the parameter for the interpolation filter, and thus a synchronous sample can be obtained.

The first baseline wander corrector 330 corrects the wandering of baseline by a feedforward control. This will be described in detail later.

The soft-output detector 320 uses a Soft-Output Viterbi Algorithm (hereinafter abbreviated as "SOVA"), a kind of Viterbi algorithm, in order to avoid the deterioration of decoding characteristics resulting from intersymbol interference. In other words, there is a problem of deteriorating decoding characteristics as a result of increased interference between recorded codes along with the rise in recording density of magnetic disk apparatuses in recent years, and a Partial Response Maximum Likelihood (hereinafter abbreviated as "PRML") method, which is based on the partial response due to intersymbol interference, is used as a method to overcome the problem. The PRML method is a method for obtaining a signal sequence that maximizes the likelihood of the partial response of reproduced signals. The output from the soft-output detector 320 can be used as the soft-value input to the LDPC decoding unit 322. Let us assume, for instance, that soft-values (0.71, 0.18, 0.45, 0.45, 0.9) have been outputted as SOVA output. These values numerically represent their likelihood of being "0" or their likelihood of being "1". For example, the first value of 0.71 signifies a strong likelihood of being 1, whereas the fourth value of 0.45 is more likely to be 0 but is also significantly likely to be 1. The output of a conventional Viterbi detector is hard values, which are the results of hard decision of SOVA output. In the above case, the values will be (1, 0, 0, 0, 1). The hard values, which represent either 0 or 1, no longer has the information suggesting the likelihood of being 0 or 1. Accordingly, the inputting soft values to the LDPC decoding unit 322 can realize better decoding characteristics.

The LDPC decoding unit 322 plays a role of restoring an LDPC-coded data sequence to the sequence before the LDPC coding. The principal methods for such decoding are the sum-product decoding method and the min-sum decoding method. While the sum-product decoding method gives a better decoding performance, the min-sum decoding method can be better realized by hardware. In the actual decoding by the use of the LDPC code, a fairly satisfactory decoding performance can be accomplished by repeatedly carrying out the decoding between the soft-output detector 320 and the LDPC decoding unit 322. In practice, therefore, the soft-output detector 320 and the LDPC decoding unit 322 need to be arranged in multiple stages. Generally speaking, in an LDPC decoding, values called a prior value and an after value are obtained, and the prior value and the after value are calculated again through the mediation of a digital aided equalizer (hereinafter abbreviated as "DAE"). At a predetermined count or when it is determined that errors are no longer present, the likelihood found at that point undergoes a hard decision, and binary decoded data are outputted. Here, the absence of errors can be determined by seeing whether the result of multiplying the decoded data containing a redundancy data sequence by a check matrix is a zero matrix or not.

That is, if the result is a zero matrix, it is determined that no errors remain in the decoded data as a result of correction, and if the result is other than a zero matrix, it is determined that there are still errors in the decoded data which have not yet been corrected. In another method for determining that there are no longer errors remaining, redundancy bits are obtained by multiplying a data sequence excluding the redundancy data sequence by a generator matrix used at the LDPC coding. Then the redundancy bits undergoes a hard decision, a comparison is made against the redundancy data sequence, and it is determined whether the errors have been corrected or not by verifying if there is agreement therebetween. The hard decision meant here is, for instance, the determination of "1" when the value is larger than a predetermined threshold value and of "0" when it is smaller than that.

The synchronizing signal detector 321 plays a role of recognizing the top position of data by detecting the sync mark added to the top of data. The RLL decoding unit 323 restores the data outputted from the LDPC decoding unit 322 to the original data sequence by carrying out a reverse operation of the RLL coding unit 303 of the write channel 31 thereon. The descrambler 324 restores the original data sequence by carrying out a reverse operation of the scrambler 302 of the write channel 31. The data generated here are transferred to the HDC 1.

Figure 3:
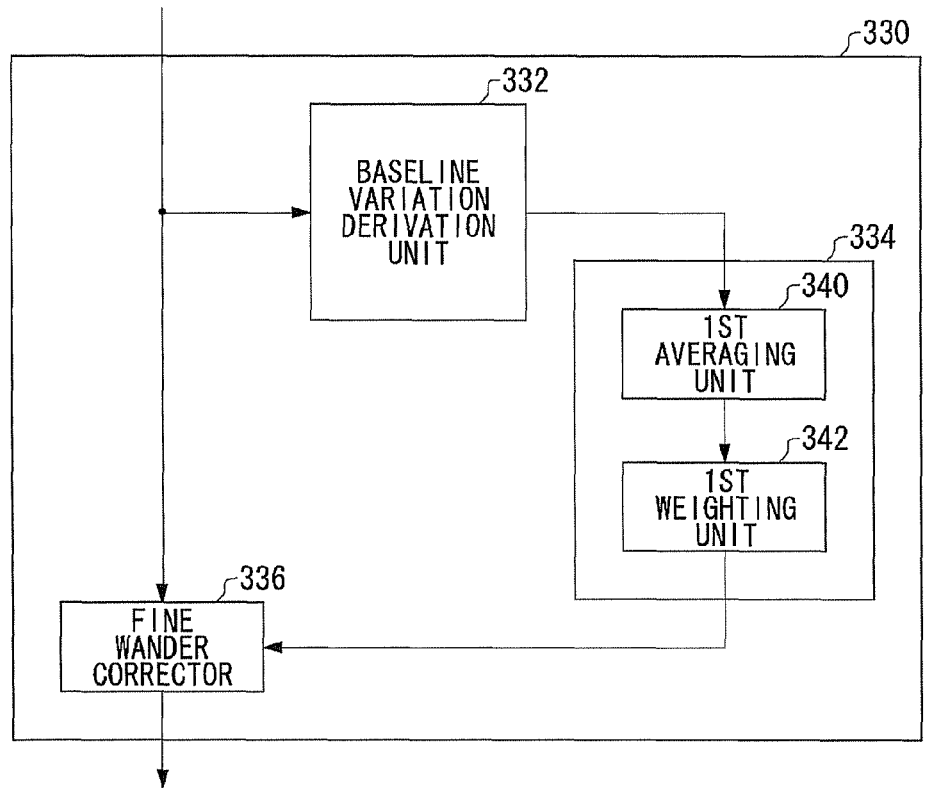
FIG. 3 illustrates an exemplary structure of a first baseline wander corrector shown in FIG. 2.

A description will now be given of a first baseline wander corrector 330. FIG. 3 illustrates an exemplary structure of a first baseline wander corrector 330 as shown in FIG. 2. The first baseline wander corrector 330 includes a baseline variation derivation unit 332, a fine variation adjuster 334, and a fine wander corrector 336.

Figure 4:
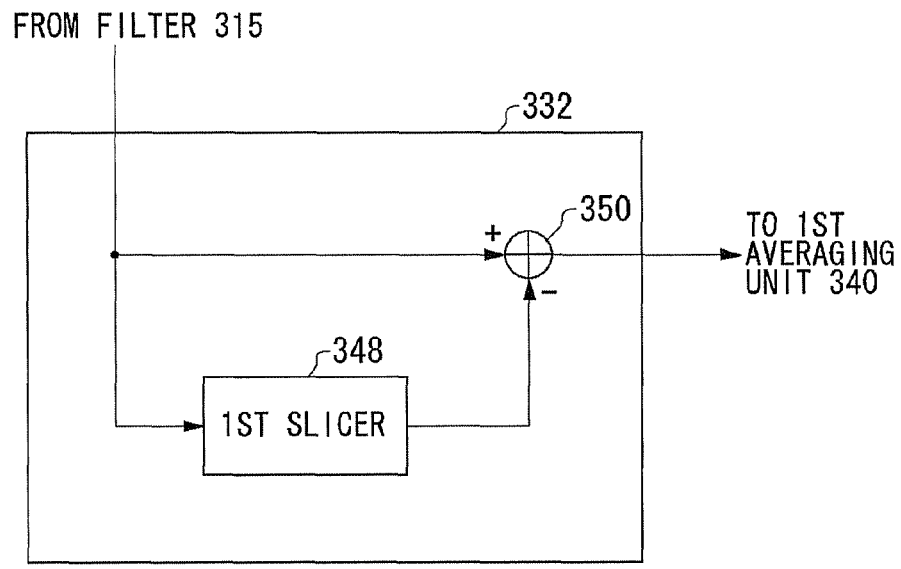
FIG. 4 illustrates an exemplary structure of a baseline wander derivation unit shown in FIG. 3.

FIG. 4 illustrates an exemplary structure of a baseline variation derivation unit 332 as shown in FIG. 3. The baseline variation derivation unit 332 includes a first slicer 348 and a first fine correction amount calculator 350. The baseline variation derivation unit 332 first carries out a hard decision of three values using the signal outputted from the filter 315 as the input to the first slicer 348, thereby determining whether the value is near plus or minus zero, on the plus side, or on the minus side. Then, the distance to any one of the three values is derived by finding the difference between the signal outputted from the filter 315 and the value obtained by the three-value decision at the first fine correction amount calculator 350.

The three values are, for example, "0", which is the intermediate value of the output of the not-shown ADC 313, "0+α", which is a threshold value α added to 0, and "0−α", which is the threshold value α subtracted from 0. If α is 1, for instance, then they will be the three values of (−1, 0, +1). The hard decision of three values is, for example, a decision that the data subjected to the hard decision is "the minimum value of ADC 313" when it is less than half of the minimum value of ADC 313, "the maximum value of ADC 313" when it is more than half of the maximum value of ADC 313, and "±0" for all the cases other than the above. For instance, the hard decision of three values when the maximum value of ADC 313 is "+1" and the minimum value thereof is "−1" will be "−1" when the data subjected to the decision is "−0.5" or below, "+1" when it is "0.5" or above, or "±0" when it is greater than "−0.5" and less than "0.5".

By making a hard decision as described above, it is determined which of the plus or minus side the data subjected to the hard decision is shifted to, and thereupon the distance to the value is obtained by the first fine correction amount calculator 350. Then, in order to determine whether there is a long-term variation or not, the moving average of the distance is calculated by a first averaging unit 340, which will be described later. Thereby, the degree and trend of variation in the signals can be determined. Generally speaking, if the output signal sequence of an ADC 313 (not shown in FIG. 3) is observed for a long interval, the counts of "+1" and "−1" will be about the same. Accordingly, when the averaging is done for a long interval, the average value is balanced over time and should ideally be "±0" eventually. However, variation in baseline, if any, is not balanced over time and brings about a phenomenon of the "±0" at the ADC 313 shifted to the plus side or the minus side, so that averaging cannot produce "±0". In other words, the baseline is varied depending on this average value, and thus the baseline variation can be corrected by correcting the amount of variation by the use of this average value.

Variation in baseline meant here is, for instance, a shift of the baseline, or the value of "±0" at the ADC 313, to the plus side or the minus side. For example, if there is a shift of "+1" in the plus direction, then data D1, whose original value is "−1", will be judged as "0", and data D2, whose original value is "0", as "+1". In other words, the data D1, which should be "−1", becoming "0" due to the variation in baseline may work such that the "0" inputted to the not-shown soft-output detector 320 in a subsequent position causes an error in the processing at the soft-output detector 320 and further makes difficult the decision of "1" or "−1" at the LDPC decoding unit 322 or the like in a subsequent position. Moreover, the data D2, which should be "0" but can be either "+1" or "−1", will be judged only as "+1". In such a case, it may so happen at the LDPC decoding unit 322 or the like in a subsequent position that the data D1 is outputted as either "−1" or "1" and the data D2 is judged to be "+1". When there is no variation in baseline, the data D1 is always judged as "−1" and the data D2 is judged as either "+1" or "−1", and therefore there may arise disagreement in the outputted results. Such development may reduce the decoding performance at the LDPC decoding unit 322 or cause a delay due to an increased number of repetition, which will eventually lead to a drastically lowered data read speed. To solve this problem, the arrangement according to the present invention is such that even when there is an instantaneously large variation in baseline, a follow-up correction can be made by the aforementioned feedback control, with the result that the performance of the soft-output detector 320, the LDPC decoding unit 322, and the storage apparatus incorporating them has been improved.

Next, a description will be given of a fine variation adjuster 334. The fine variation adjuster 334 includes a first averaging unit 340 and a first weighting unit 342. The first averaging unit 340 acquires an average value for a predetermined interval. Since the baseline correction according to the present embodiment aims to follow up instantaneous variations, the averaging processing employed by the first averaging unit 340 is not an interval averaging but a moving averaging. The first weighting unit 342 acquires the amount of fine correction by multiplying the average value outputted from the first averaging unit 340 by a predetermined weighting factor. The weighting factor is preferably "1" or below because the first baseline wander corrector 330 performs correction by a feed-forward control.

Next, a description will be given of a fine wander corrector 336. The fine wander corrector 336 carries out fine correction of baseline variation through a process of subtracting the amount of fine correction determined by the fine variation adjuster 334 from the output of the filter 315.

It is to be noted here that the averaging interval used by the first averaging unit 340 may be one given from the outside or may be one to be changed dynamically. Also, the weighting factor used by the first weighting unit 342 may be one given from the outside or may be one to be changed dynamically.

Figure 5:
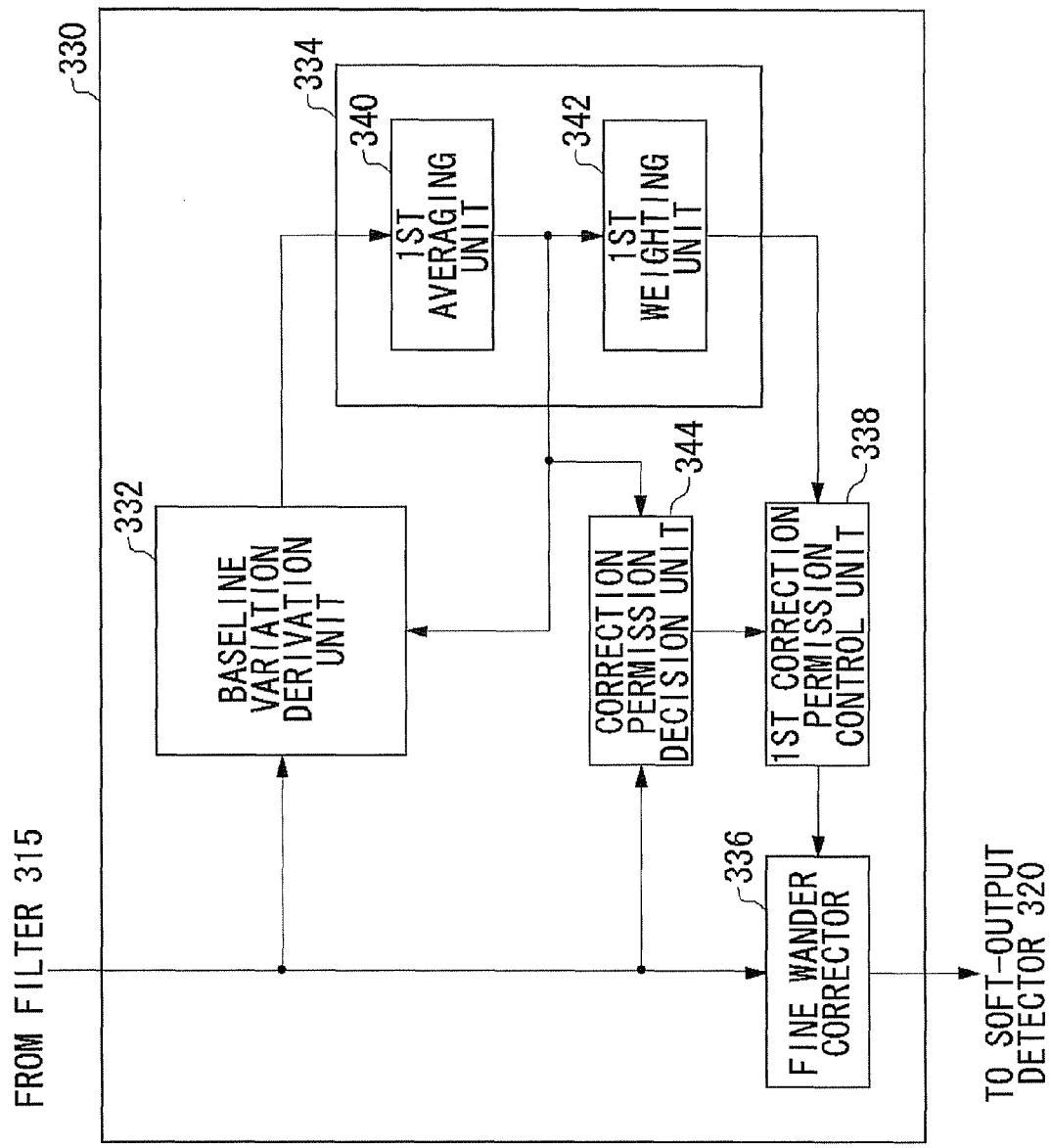
FIG. 5 illustrates a modification of a structure of a first baseline wander corrector shown in FIG. 2.

A description will now be given of a modification of a first baseline wander corrector 330. FIG. 5 illustrates a modification of an exemplary structure of a first baseline wander corrector 330 as shown in FIG. 2. Note that the same components as those in FIG. 3 are denoted with the same reference numerals and their repeated explanation is omitted here. The difference from FIG. 3 lies in that the first baseline wander corrector 330 further includes a first correction permission control unit 338 and a correction permission decision unit 344. Another difference lies in that the baseline variation derivation unit 332 uses the outputted result from the first averaging unit 340 as one of the inputs.

Figure 6:
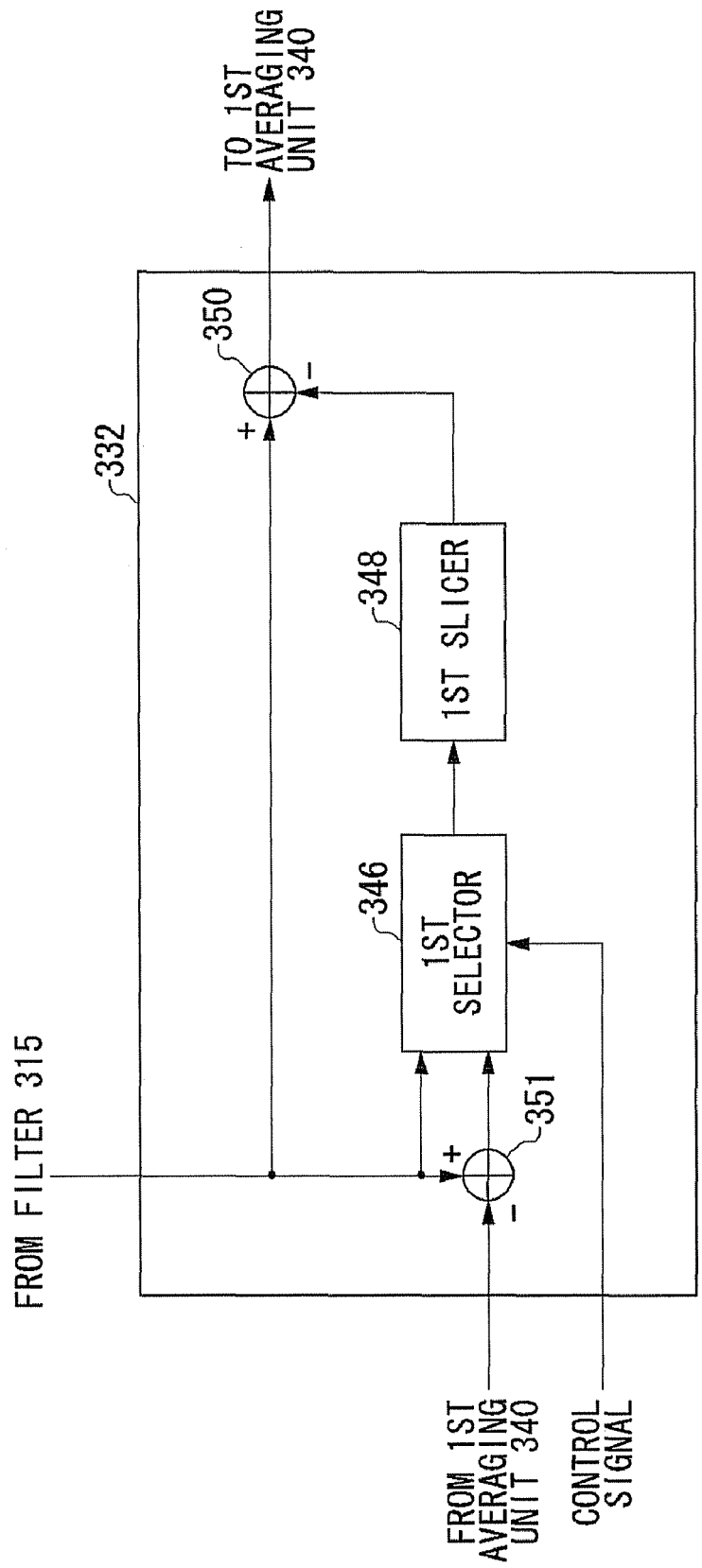
FIG. 6 illustrates an exemplary structure of a baseline wander derivation unit shown in FIG. 5.

FIG. 6 illustrates an exemplary structure of a baseline variation derivation unit 332 as shown in FIG. 5. The baseline variation derivation unit 332 includes a first selector 346, a first slicer 348, a first fine correction amount calculator 350, and a second fine correction amount calculator 351. The baseline variation derivation unit 332 of FIG. 6 firstly receives an output signal from the filter 315 and an average value, which is the output from the first averaging unit 340 shown in FIG. 5, as inputs to the first selector 346. The first selector 346 outputs either value of the signal outputted from the filter 315 and the corrected value of the output signal of the filter 315 to the first slicer 348, according to the control signal inputted from the outside. The correction here is carried out by the second fine correction amount calculator 351, which subtracts the output of the first averaging unit 340 shown in FIG. 5 from the output from the filter 315. The explanation of the first slicer 348 and the first fine correction amount calculator 350 is omitted because they are the same as those previously explained.

In this manner, the amount of fine correction can be calculated with greater accuracy by using the value of the output signal from the filter 315 corrected by the average value outputted from the first averaging unit 340 instead of the output signal from the filter 315 itself. The arrangement like this is employed because the output signal from the filter 315, at this stage, still contains baseline variation and thus is not considered an accurate value. Acquiring the amount of fine correction by the first slicer 348 and the first fine correction amount calculator 350 using the value after the correction of baseline variation by averaging instead of using the output signal of the filter 315 is equal to gaining the effect of correcting the amount of fine correction. This arrangement accomplishes an accurate baseline variation correction by acquiring a more accurate amount of fine correction.

Figure 7:
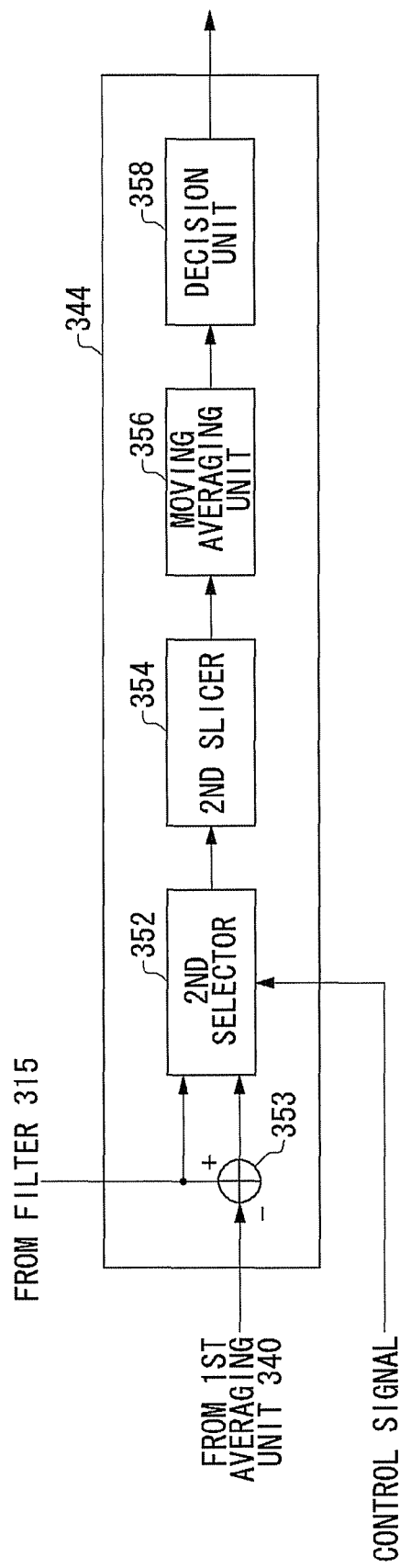
FIG. 7 illustrates an exemplary structure of a correction permission decision unit shown in FIG. 5.

FIG. 7 illustrates an exemplary structure of a correction permission decision unit 344 as shown in FIG. 5. The correction permission decision unit 344, which is a circuit to determine whether to carry out the correction of baseline variation or not, includes a second selector 352, a second slicer 354, a moving averaging unit 356, a decision unit 358, and a third fine correction amount calculator 353. Firstly the second selector 352 outputs either value of the output signal from the filter 315 and the corrected value of the output signal of the filter 315 to the second slicer 354, according to the control signal inputted from the outside. The correction here is carried out by the third fine correction amount calculator 353, which subtracts the output signal of the first averaging unit 340 from the output signal from the filter 315. For the same reason as for the aforementioned first selector 346, it is so arranged that the second selector 352 can select the output signal of the first averaging unit 340. Then, similarly to the aforementioned first slicer 348, the second slicer 354 makes a hard decision on the signal outputted from the second selector 352. The moving averaging unit 356 obtains a moving average of the signals having been subjected to a hard decision. The decision unit 358 compares the moving-averaged value against a predetermined threshold value and outputs a signal indicating whether the baseline variation has to be corrected or not.

To be more precise, a signal permitting the correction of baseline variation, which is assumed to be present, is outputted when the hard decision at the second selector 352 has been one of the three values of (−1, 0, +1) and besides the result of the hard decision is other than "0". And when the result of the hard decision is "0", it is assumed that there has been no baseline variation, and thus a signal rejecting the permission for correction is outputted. It is to be noted here that a correction, if made without the presence of baseline variation, can instead cause some additional baseline variation. Therefore, the arrangement according to the present embodiment is such that correction is not permitted when the result of the hard decision is "0". However, due to the effect of noise and the like, the amount of fine correction calculated by the baseline variation derivation unit 332 of FIG. 5 rarely becomes "0". Hence, when the output value of the moving averaging unit 356 is "0±α", the "α" being a threshold value, a signal rejecting the permission for correction is outputted. And when it is not so, a signal indicating the permission for correction is outputted. Also, two threshold values of α and β may be used, and when the output value is larger than "0−β" and smaller than "0+α", a decision on the permission for correction may be made on the assumption that there has been no baseline variation. Also, these threshold values may be predetermined, or they may be ones to be specified from the outside or ones changing dynamically. In any of such cases, a similar advantageous effect can be achieved.

The first correction permission control unit 338 selects a signal to be outputted to the fine wander corrector 336, according to the decision result by the correction permission decision unit 344. More specifically, when the decision result by the correction permission decision unit 344 is a signal indicating the permission for correction, the output result of the fine variation adjuster 334 is directly outputted to the fine wander corrector 336. And if it is a signal rejecting the permission for correction, "0" is outputted to the fine wander corrector 336. The fine wander corrector 336 carries out fine correction of baseline variation by subtracting the output signal of the first correction permission control unit 338 from the output signal of the filter 315.

According to the present embodiment, even when there has been an instantaneously large variation in baseline, the baseline variation can be efficiently corrected without being affected by the delay resulting at the correction. Moreover, the amount of fine correction can be calculated with greater accuracy by correcting the amount of variation using an average value selected according to a selection signal from the outside and correcting the baseline variation using the thus corrected amount of variation. Also, the effect of error correction can be improved by correcting the baseline variation with better accuracy. Furthermore, the improved effect of error correction can realize a high-speed read and write control for the storage apparatus.

In the present embodiment, a description has been given with reference to FIG. 5 that the output signal of the first averaging unit 340 is inputted as one of the inputs of the baseline variation derivation unit 332 and as one of the inputs of the correction permission decision unit 344. However, the arrangement is not limited thereto, and the output signal of the first weighting unit 342 may be inputted to the baseline variation derivation unit 332 and the correction permission decision unit 344. In this case, too, a similar advantageous effect can be achieved. Also, with reference to FIG. 6, a description has been given that a signal, which is the output signal from the filter 315 corrected by the output signal of the first averaging unit 340, is inputted as one of the inputs of the first selector 346. However, the arrangement is not limited thereto, and a signal, which is the output signal from the filter 315 corrected by the output signal of the first weighting unit 342, may be inputted as one of the inputs of the first selector 346. In this case, too, a similar advantageous effect can be achieved. Also, with reference to FIG. 7, a description has been given that a signal, which is the output signal from the filter 315 corrected by the output signal of the first averaging unit 340, is inputted as one of the inputs of the second selector 352. However, the arrangement is not limited thereto, and a signal, which is the output signal from the filter 315 corrected by the output signal of the first weighting unit 342, may be inputted as one of the inputs of the second selector 352. In this case, too, a similar advantageous effect can be achieved.

Second Embodiment

Before explaining a second embodiment of the present invention in concrete terms, a brief description will be given of a storage apparatus relating to the present embodiment. A storage apparatus according to the present embodiment includes a hard disk controller, a magnetic disk apparatus, and a read/write channel, which includes a read channel and a write channel. At the read channel, correction of the above-mentioned baseline variation is made on the data read out from the magnetic disk apparatus by a feedforward control, and the baseline variation is also corrected by a feedback control at a stage posterior to an A-D converter. By employing this structure, it is possible to correct baseline variation efficiently and accurately without the effects of delay occurring at the time of correction not only when there is instantaneously a large variation in baseline but also when the baseline varies gradually over a long period of time. This will be described in detail later.

Figure 8:
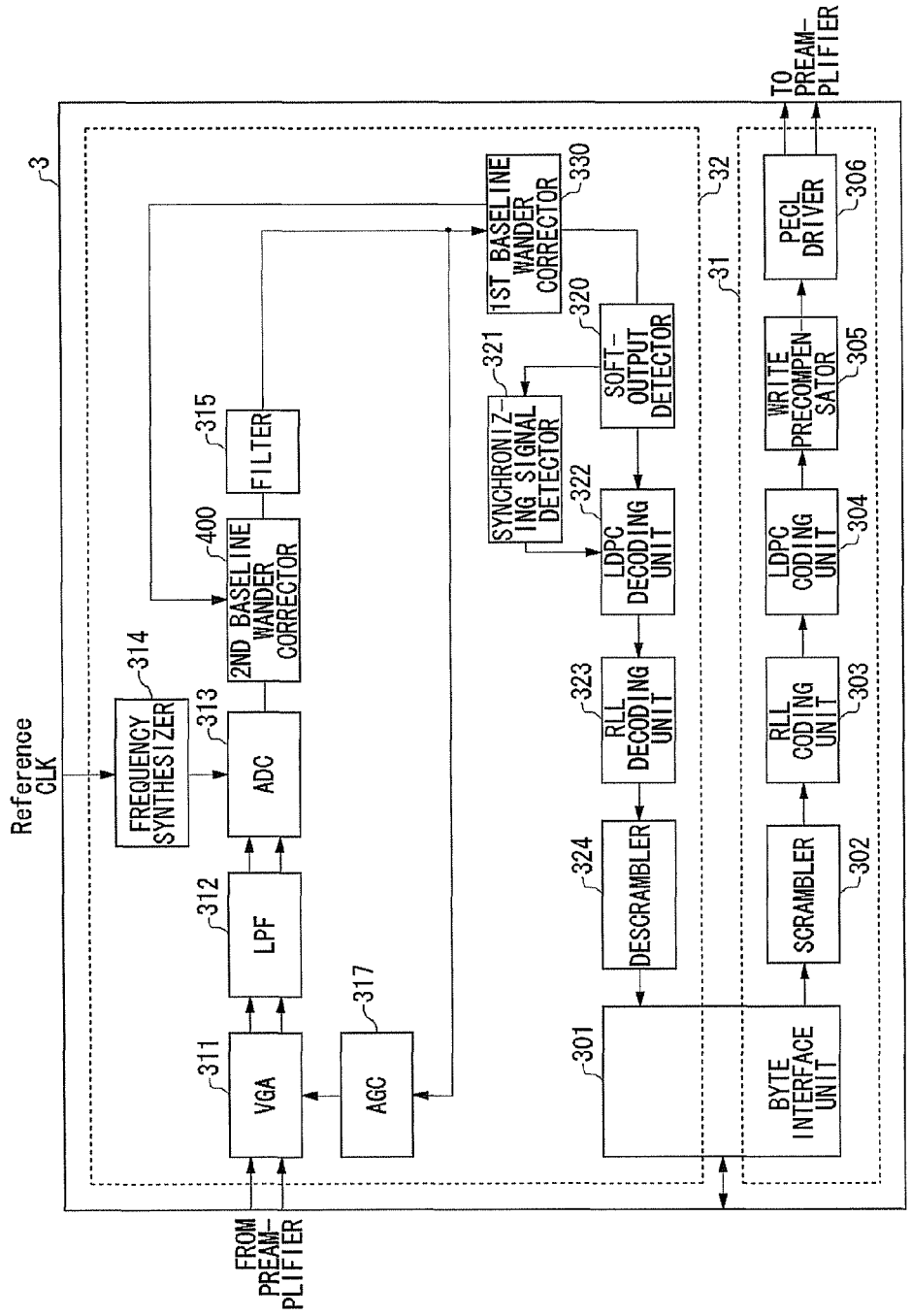
FIG. 8 illustrates an exemplary structure of an R/W channel according to a second embodiment of the present invention.

FIG. 8 illustrates an exemplary structure of an R/W channel 3 according to the second embodiment. The R/W channel 3 is comprised roughly of a write channel 31 and a read channel 32. The read channel 32 includes a VGA 311, an LPF 312, an AGC 317, an ADC 313, a frequency synthesizer 314, a filter 315, a soft-output detector 320, an LDPC decoding unit 322, a synchronizing signal detector 321, a run-length limited decoding unit 323, a descrambler 324, a first baseline wander corrector 330, and a second baseline wander corrector 400. Note that except for the second baseline wander corrector 400, the same components as those in FIG. 2 are denoted with the same reference numerals and the description thereof will be omitted here.

Figure 9:
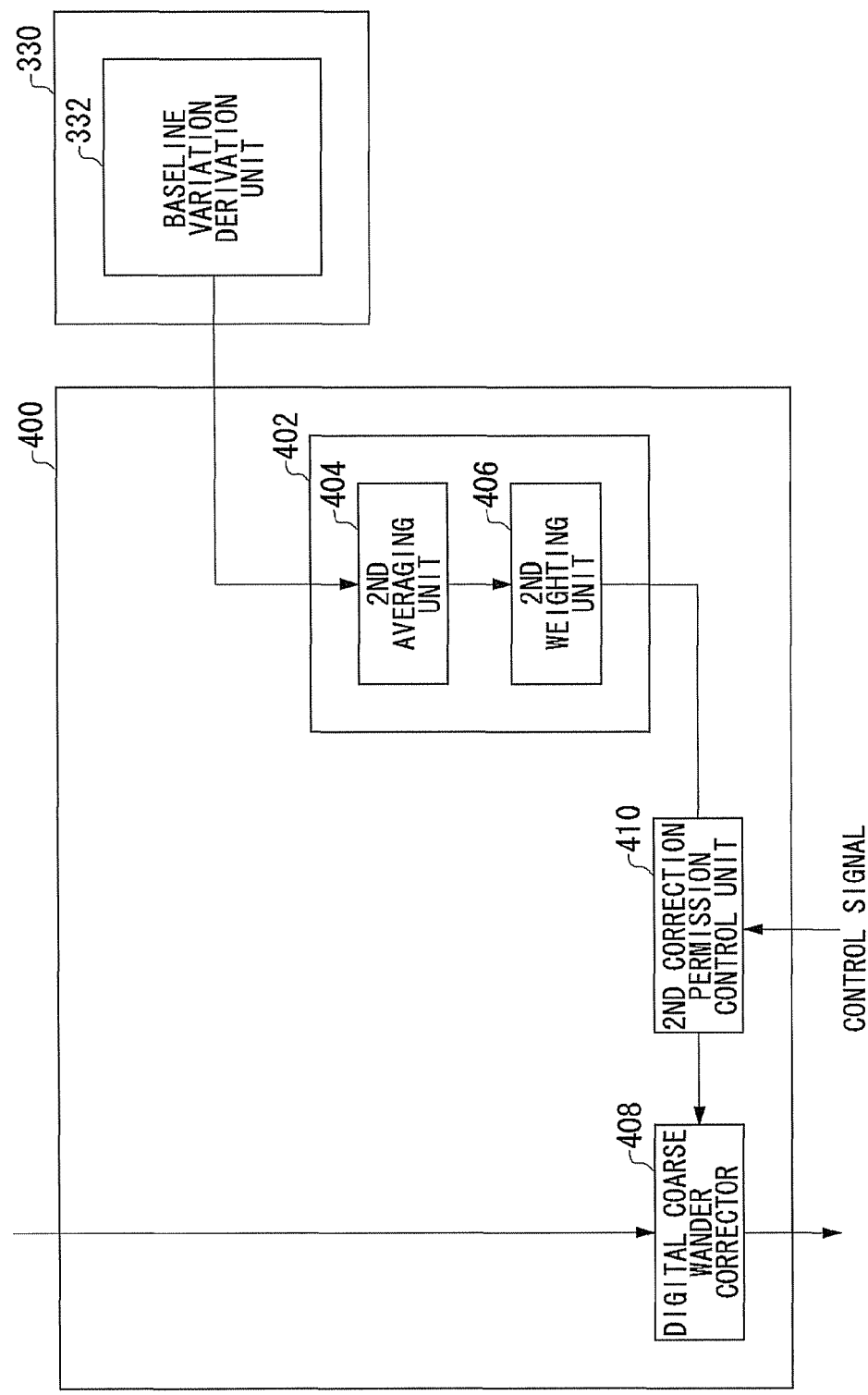
FIG. 9 illustrates an exemplary structure of a second baseline wander corrector shown in FIG. 8.

FIG. 9 illustrates an exemplary structure of a second baseline wander corrector 400 as shown in FIG. 8. The second baseline wander corrector 400 includes a digital coarse variation adjuster 402, a digital coarse wander corrector 408, and a second correction permission control unit 410. And the digital coarse variation adjuster 402 includes a second averaging unit 404 and a second weighting unit 406.

The digital coarse variation adjuster 402 includes a second averaging unit 404 and a second weighting unit 406. The second averaging unit 404 acquires an average value in an interval of a predetermined length, using the output signal of a coarse correction amount calculator 418 of a baseline variation derivation unit 332 to be described later as the input. This average value may be obtained by moving averaging. The second weighting unit 406 acquires the amount of digital coarse correction by multiplying the average value outputted from the second averaging unit 404 by a predetermined weighting factor. Note that the averaging interval length at the second averaging unit 404 is preferably greater than that at the first averaging unit 340. Also, this averaging interval length may be one given from the outside or one changing dynamically. Also, the weighting factor at the second weighting unit 406 is preferably 1 or below and at the same time smaller than the weighting factor at the first weighting unit 342.

The arrangement is such that the averaging interval for the second averaging unit 404 is longer than that for the first averaging unit 340 and the weighting factor at the second weighting unit 406 is smaller than that at the first weighting unit 342. The reason is that the first baseline wander corrector 330 including the first averaging unit 340 and the second baseline wander corrector 400 including the second averaging unit 404 play different roles from each other. That is, while the first baseline wander corrector 330 is designed to respond to instantaneous variations, the second baseline wander corrector 400 is designed to make corrections by tracking the variations of baseline longer-term than the first baseline wander corrector 330. And to determine these longer-term baseline variations, it is necessary for the second averaging unit 404 to carry out averaging for long intervals. "Making corrections by tracking the baseline variations long-term" meant here is correcting variations gradually by predicting the future trend or pattern in baseline variation from the past trend or pattern therein. However, it is to be noted that the use of the past trend in variation does not warrant correct responses to instantaneous variations and that the past trend in variation does not necessarily foretell the future trend in variation. For this reason, it is so arranged that the weighting factor at the second weighting unit 406 is 1 or below and, in addition, of a value smaller than that at the first weighting unit 342 which tracks instantaneous variations. In this manner, the clear division of roles between the first baseline wander corrector 330 and the second baseline wander corrector 400 assures the correction of baseline variations by tracking not only instantaneous variations but also long-term variations.

Next, a description will be given of a second correction permission control unit 410. The second correction permission control unit 410 selects a signal to be outputted to the digital coarse wander corrector 408. More specifically, when the control signal for the permission or rejection of correction, which is predetermined or inputted from the outside, is a signal indicating the permission for correction, the output result of the digital coarse variation adjuster 402 is directly outputted to the digital coarse wander corrector 408. And when it is a signal rejecting the permission for correction, "0" is outputted to the digital coarse wander corrector 408. The digital coarse wander corrector 408 carries out coarse correction of baseline variation by subtracting the output signal of the second correction permission control unit 410 from the output signal of the ADC 313.

Figure 10:
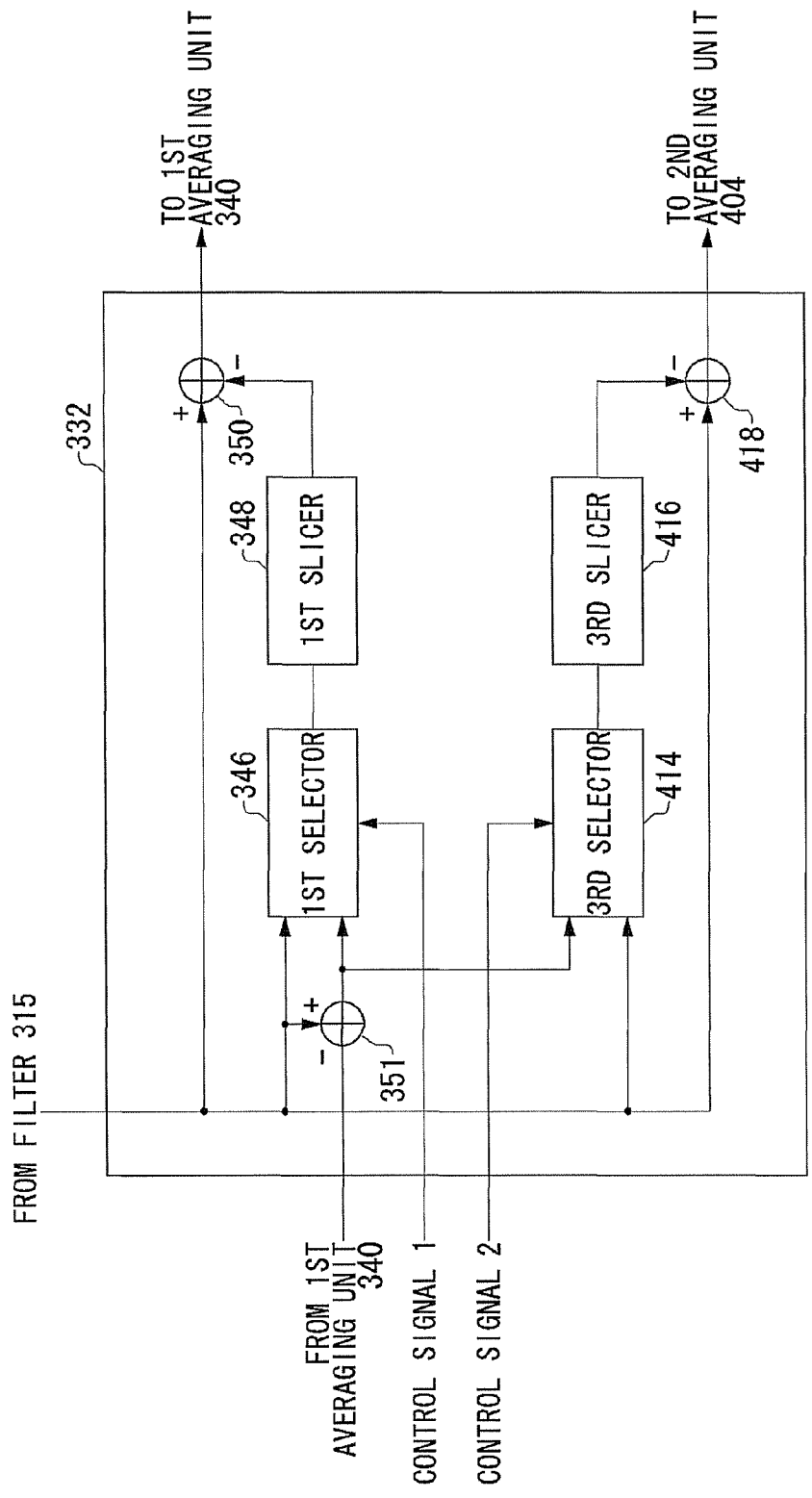
FIG. 10 illustrates an exemplary structure of a baseline variation derivation unit shown in FIG. 9.

A description will now be given of a baseline variation derivation unit 332 as shown in FIG. 9 which generates input signals for averaging by the second averaging unit 404. FIG. 10 illustrates an exemplary structure of a baseline variation derivation unit 332 as shown in FIG. 9. The baseline variation derivation unit 332 of FIG. 10 includes a first selector 346, a first slicer 348, a first fine correction amount calculator 350, a second fine correction amount calculator 351, a third selector 414, a third slicer 416, and a coarse correction amount calculator 418. Note that the same components as those of the baseline variation derivation unit 332 in FIG. 6 are denoted with the same reference numerals and the description thereof will be omitted.

Firstly, an output signal from the filter 315 and an average value, which is the output of the first averaging unit 340 as shown in FIG. 5, are inputted to the third selector 414. The third selector 414 outputs either value of the output signal from the filter 315 and the corrected value of the output signal of the filter 315 to the third slicer 416, according to the control signal inputted from the outside. The correction here is carried out by the second fine correction amount calculator 351, which subtracts the output signal of the first averaging unit 340 as shown in FIG. 5 from the output signal of the filter 315. The description of the third slicer 416 and the coarse correction amount calculator 418 is omitted because they are basically the same as the first slicer 348 and the first fine correction amount calculator 350, respectively. Also, the reason for the arrangement that either value of the output signal from the filter 315 and the corrected value of the output signal of the filter 315 can be selected is the same as one given in the description of the first selector 346, and therefore the description thereof is omitted here. The amount of coarse correction can be calculated with better accuracy by the arrangement as described above.

According to the second embodiment, even when there has been an instantaneously large variation in baseline, the baseline variation can be efficiently corrected without being affected by the delay resulting at the correction. Also, the division of roles between the two baseline wander correctors ensures the efficient and accurate correction of baseline variation without being affected by the delay resulting at the correction while tracking not only instantaneous variations but also long-term variations. Moreover, the amount of fine correction can be calculated with greater accuracy by correcting the amount of variation using an average value selected according to a selection signal from the outside and correcting the baseline variation using the thus corrected amount of variation. Further, the structure implemented in the second embodiment uses a reduced scale of hardware because the second baseline wander corrector 400 does not have a circuit for independently calculating the amount of baseline variation and instead the amount of baseline variation calculated by the baseline variation derivation unit 332 of the first baseline wander corrector 330 is utilized. Also, the effect of error correction can be improved by correcting the baseline variation with better accuracy. Furthermore, the improved effect of error correction can realize a high-speed read and write control for the storage apparatus.

In the present embodiment, a description has been given with reference to FIG. 10 that a signal, which is the output signal of the filter 315 corrected by the output signal of the first averaging unit 340, is inputted as one of the inputs of the first selector 346. However, the arrangement is not limited thereto, and the output signal of the filter 315 having been corrected by the output signal of the first weighting unit 342 may be inputted as one of the inputs of the first selector 346. In this case, too, a similar advantageous effect can be achieved. Also, a description has been given that a signal, which is the output signal from the filter 315 corrected by the output signal of the first averaging unit 340, is inputted as one of the inputs of the third selector 414. However, the arrangement is not limited thereto, and a signal, which is the output signal from the filter 315 corrected by the output signal of the first weighting unit 342, may be inputted as one of the inputs of the first selector 346. In this case, too, a similar advantageous effect can be achieved.

Third Embodiment

Before explaining a third embodiment of the present invention in concrete terms, a brief description will be given of a storage apparatus relating to the present embodiment. A storage apparatus according to the present embodiment includes a hard disk controller, a magnetic disk apparatus, and a read/write channel, which includes a read channel and a write channel. At the read channel, correction of the above-mentioned baseline variation is made on the data read out from the magnetic disk apparatus by a feedforward control, and the baseline variation is also corrected at stages anterior to and posterior to an A-D converter. By employing this structure, it is possible to correct baseline variation efficiently and accurately without the effects of delay occurring at the time of correction not only when there is instantaneously a large variation in baseline but also when the baseline varies gradually over a long period of time. Furthermore, the correction is made for a long-term variation at two stages of before and after an A-D converter, more fine-tuned and detailed correction can be made. This will be described in detail later.

Figure 11:
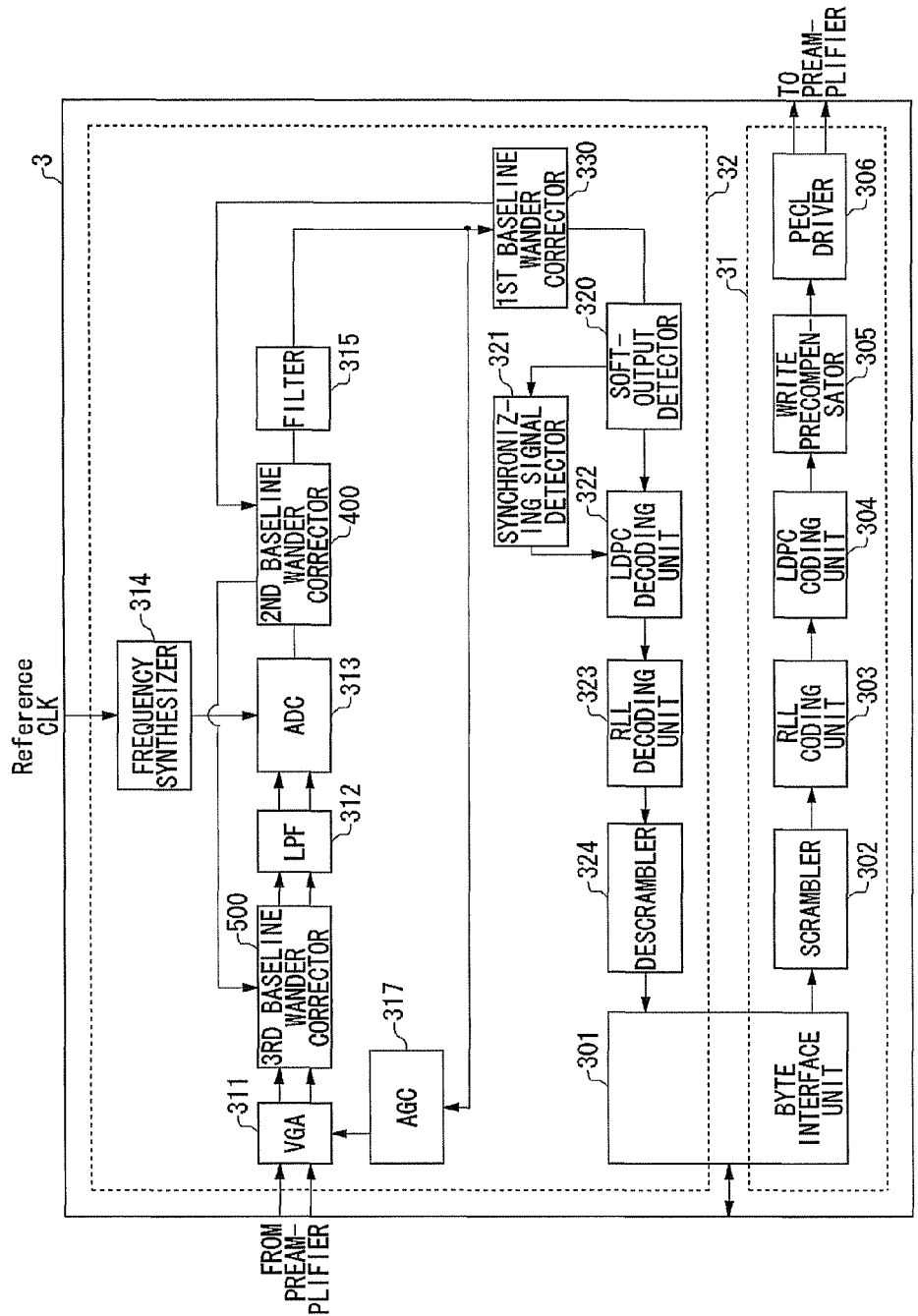
FIG. 11 illustrates an exemplary structure of an R/W channel according to a third embodiment of the present invention.

FIG. 11 illustrates an exemplary structure of an R/W channel 3 according to a third embodiment. The R/W channel 3 is comprised roughly of a write channel 31 and a read channel 32. The read channel 32 includes a VGA 311, an LPF 312, an AGC 317, an ADC 313, a frequency synthesizer 314, a filter 315, a soft-output detector 320, an LDPC decoding unit 322, a synchronizing signal detector 321, a run-length limited decoding unit 323, a descrambler 324, a first baseline wander corrector 330, and a second baseline wander corrector 400, and a third baseline wander corrector 500. Note that the components identical to those in FIG. 8 are given the same reference numerals and the description thereof will be omitted here.

Figure 12:
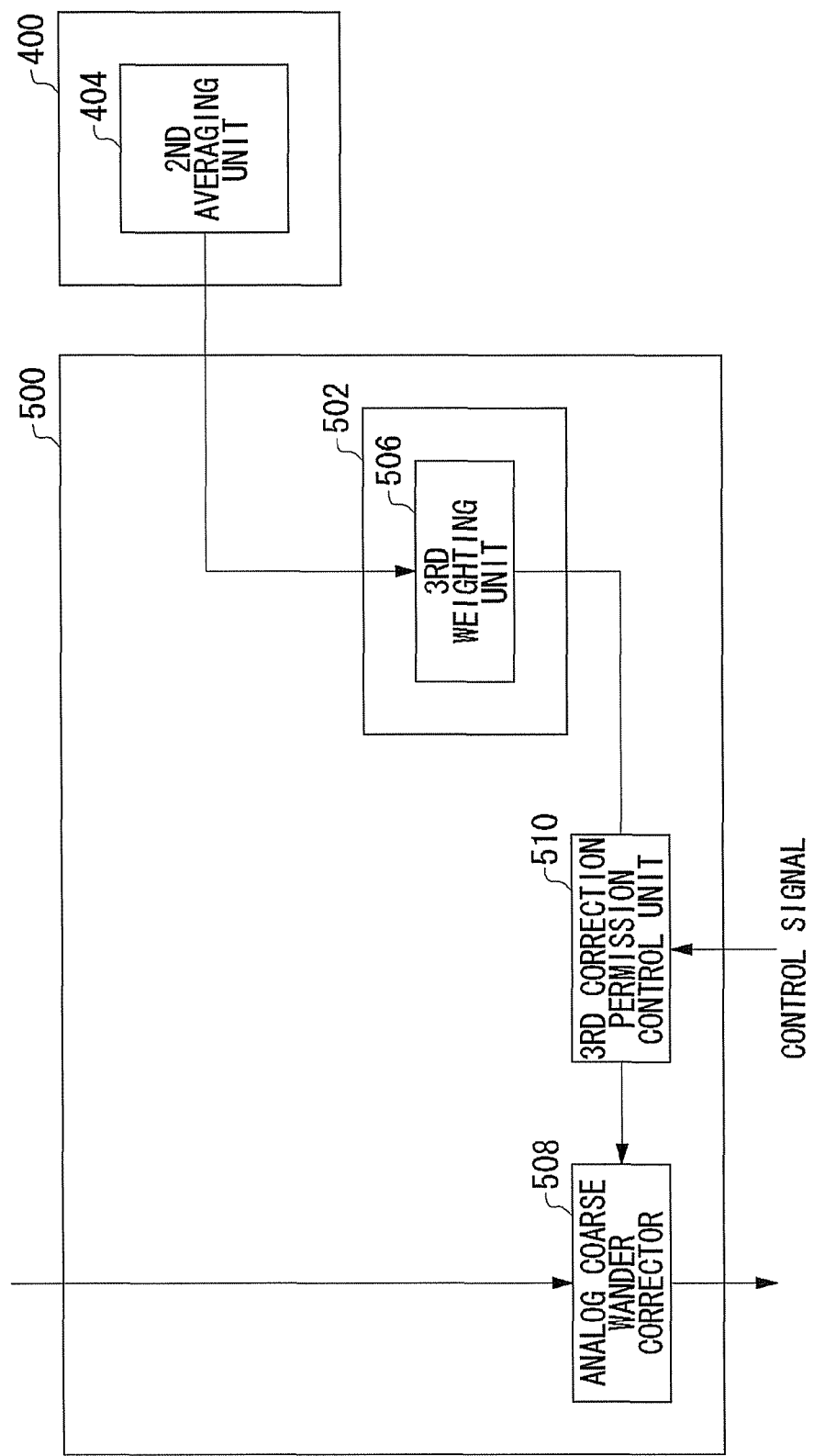
FIG. 12 illustrates an exemplary structure of a third baseline wander corrector shown in FIG. 11.

FIG. 12 illustrates an exemplary structure of a third baseline wander corrector 500 as shown in FIG. 11. The third baseline wander corrector 500 includes an analog coarse variation adjuster 502, an analog coarse wander corrector 508, and a third correction permission control unit 510. And the analog coarse variation adjuster 502 includes a third weighting unit 506.

The analog coarse variation adjuster 502 includes a third weighting unit 506. The third weighting unit 506 acquires the amount of analog coarse correction by multiplying the average value outputted from the second averaging unit 404 by a predetermined weighting factor, using this output signal as the input. Note that the weighting factor at the third weighting unit 506 is preferably 1 or below and less than the weighting factor at the first weighting unit 342 and the second correction permission control unit 410 both not shown in FIG. 12.

The reason why the weighting factor in the third weighting unit 506 is set to a value less than those in the first weighting unit 342 and the second weighting unit 406 is that they play different roles from each other. That is, while the first baseline wander corrector 330 including the first weighting unit 342 is designed to respond to instantaneous variations, the third baseline wander corrector 500 is designed to make corrections by tracking the variations of baseline longer-term than the first baseline wander corrector 330. Also, since, similar to the purpose of the third baseline wander corrector 500, the second baseline wander corrector 400 including the second weighting unit 406 is designed to make corrections by tracking the variations of baseline longer-term than the first baseline wander corrector 330, different weighting factors are used between them. This is due to the respective positions at which they are positioned. The third baseline wander corrector 500 placed in an earlier stage is to treat a signal of more future. However, as was discussed above, more future the signal belongs to, more difficult it is to predict the variation in the baseline from the past trend in variation. For this reason, the weighting factor of the third weighting unit 506 is set smaller than the weighting factor of the second weighting unit 406. In this manner, the clear division of roles among the first baseline wander corrector 330, the second baseline wander corrector 400 and the third baseline wander corrector 500 assures the correction of baseline variations by tracking not only instantaneous variations but also long-term variations.

Next, a description will be given of a third correction permission control unit 510. The third correction permission control unit 510 selects a signal to be outputted to the analog coarse wander corrector 508. More specifically, when the control signal for the permission or rejection of correction, which is predetermined or inputted from the outside, is a signal indicating the permission for correction, the output result of the analog coarse variation adjuster 502 is directly outputted to the analog coarse wander corrector 508. And when it is a signal rejecting the permission for correction, "0" is outputted to the analog coarse wander corrector 508. The analog coarse wander corrector 508 carries out coarse correction of baseline variation by subtracting the output signal of the third correction permission control unit 510 from the output signal of the VGA 311.

Figure 13:
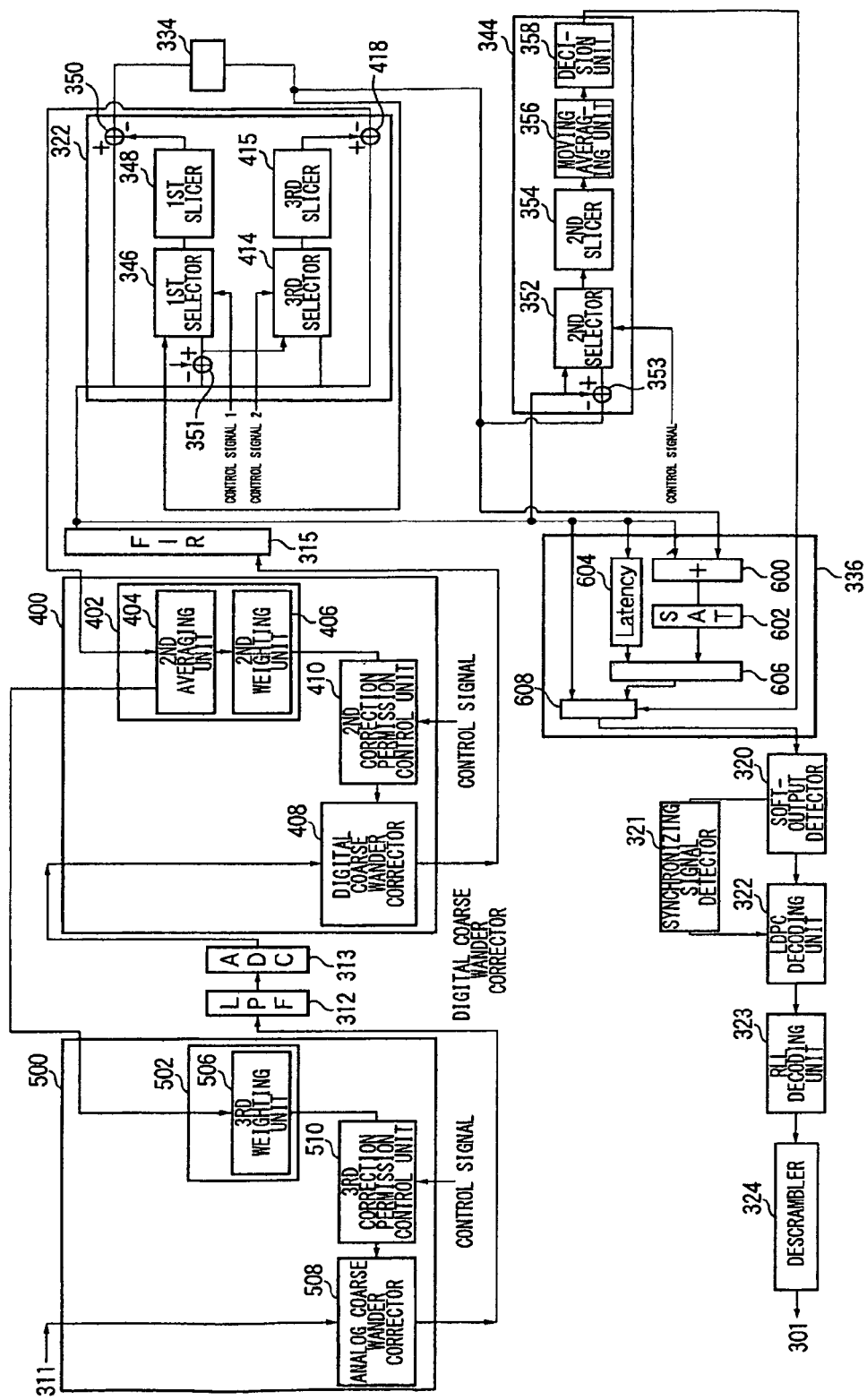
FIG. 13 illustrates part of an exemplary structure of an R/W channel shown in FIG. 11.

FIG. 13 illustrates part of an exemplary structure of the R/W channel 3 shown in FIG. 11. The components similar to the previously described embodiments are given the same reference numerals as those of the same structure and the description thereof is simplified. Note that the first baseline wander corrector 330 has the same structure as that of FIG. 5. The structure corresponding to the first correction permission control unit 338 is omitted here. Referring to FIG. 13, the finer wander corrector 336 includes an adder 600, a saturator 602, a delay unit 604, a comparator 606, and a selector 608.

The adder 600 adds up a signal outputted from the filter 315 and a signal outputted from the fine variation adjuster 334. If the signal added up in the adder 600 exceeds a predetermined maximum value, the saturator 602 will output the maximum value. If it does not exceed the maximum value, the saturator 602 will output the signal intact. The delay unit 604 delays the signal outputted from the filter 315. The comparator 606 compares the signal outputted from the delay unit 604 with the signal outputted from the saturator 602, and selects either one of them. The selector 608 selects either one of the signal outputted from the filter 315 and the signal outputted from the comparator 606, based on the signal from the correction permission decision unit 344, so as to be outputted. According employing such an embodiment as this, when the correction permission decision unit 344 determines that the correction be permitted, a signal where the output of the filter is added with the output of the first averaging unit 340 is outputted from the finer wander corrector 336. On the other hand, when the correction permission decision unit 344 determines that the correction not be permitted, the output of the filter directly becomes the output of the finer wander corrector 336.

According to the third embodiment, even when there has been an instantaneously large variation in baseline, the baseline variation can be efficiently corrected without being affected by the delay resulting at the correction. The baseline variations are corrected at two stages anterior to and posterior to the A-D converter, in the long term. This structure ensures the efficient, accurate and fine-tuned correction of baseline variation without being affected by the delay resulting at the correction while tracking not only instantaneous variations but also long-term variations that gradually advance. Further, the structure implemented in the third embodiment uses a reduced scale of hardware because the third baseline wander corrector 500 does not have a circuit for independently calculating the amount of baseline variation and instead the amount of baseline variation calculated by the baseline variation derivation unit 332 of the first baseline wander corrector 330 is utilized. Moreover, the amount of fine correction can be calculated with greater accuracy by correcting the amount of variation using an average value selected according to a selection signal from the outside and correcting the baseline variation using the thus corrected amount of variation. Also, the effect of error correction can be improved by correcting the baseline variation with better accuracy. Furthermore, the improved effect of error correction can realize a high-speed read and write control for the storage apparatus.

In the present embodiment, a description was given in the case when the third baseline wander corrector 500 is provided between the VGA 311 and the LPF 312. However, this should not be considered as limiting and, for example, the third baseline wander corrector 500 may be provided before the VGA 311 or subsequent to the LPF 312.

In the present embodiment, a description has been given of a case where three values of "−1", "0" and "1" are used. However, this should not be considered as limiting and, for example, the values used may be values greater than or equal to "0", such as "0", "1" and "2". Using the values greater than or equal to 0 makes the structure of a subsequent processing circuit easier.

The present invention has been described based on the embodiments. These embodiments are merely exemplary, and it is understood by those skilled in the art that various modifications to the combination of each component and process thereof are possible and that such modifications as well as any combination among the embodiments described above are also within the scope of the present invention.

What is claimed is:

1. A baseline correction apparatus comprising:
   an input unit which receives input of an analog-to-digital converted digital signal;
   a conversion unit which converts the digit signal inputted to said input unit, into a decision signal that takes any one of three values over time;
   a moving averaging unit which takes a moving average of the decision signal from said conversion unit;
   a decision unit which determines whether the decision signal is balanced over time or not, based on an output of said moving averaging unit; and
   a correction unit which corrects the signal from said input unit when the decision signal is not balanced over time or which does not correct the digital signal when the decision signal is balanced over time, based on an output of said decision unit,
   whereby said baseline correction apparatus corrects the baseline variation in the digital signal, and
   wherein said moving averaging unit is structured such that a different output is generated between
   in a first case where in the decision signals a middle value of the three values continues for a predetermined period or a difference between the numbers of two values opposite to each other with the middle value interposed therebetween is less than or equal to a predetermined number in the predetermined period, and
   in a second case where in the decision signals the difference between the numbers of two values opposite to each other with the middle value interposed therebetween is greater than or equal to the predetermined number in the predetermined period, and wherein, in the first case, said decision unit determines, based on an output of said moving averaging unit, that the value of the decision signal is balanced over time.

2. A baseline correction apparatus according to claim 1, wherein the decision signal takes values of "−1", "0" and "1" and said moving averaging unit converts said three values into converted signals of "0", "1", and "2", respectively, and adds up a change over time in the converted signals for a predetermined period so as to be outputted, and wherein when a summation output is within a predetermined range, said decision unit determines that the decision signal belongs to the first case.

3. A baseline correction apparatus according to claim 2, wherein said correction unit has a correction means which corrects the baseline of the digital signal, based on the moving average of the digital signal.

4. A baseline correction apparatus according to claim 1, wherein said correction unit has a correction means which corrects the baseline of the digital signal, based on the moving average of the digital signal.

5. A baseline correction apparatus according to claim 1, wherein said correction unit has a correction means which corrects the baseline of the digital signal, based on the moving average of the digital signal.

6. A baseline correction apparatus according to claim 1, wherein the decision signal takes values of "−1", "0" and "1" and said moving averaging unit converts said three values into converted signals greater than or equal to "0", respectively, and adds up a change over time in the converted signals for a predetermined period so as to be outputted, and wherein when a summation output is within a predetermined range, said decision unit determines that the decision signal belongs to the first case.

* * * * *